UNITED STATES PATENT OFFICE.

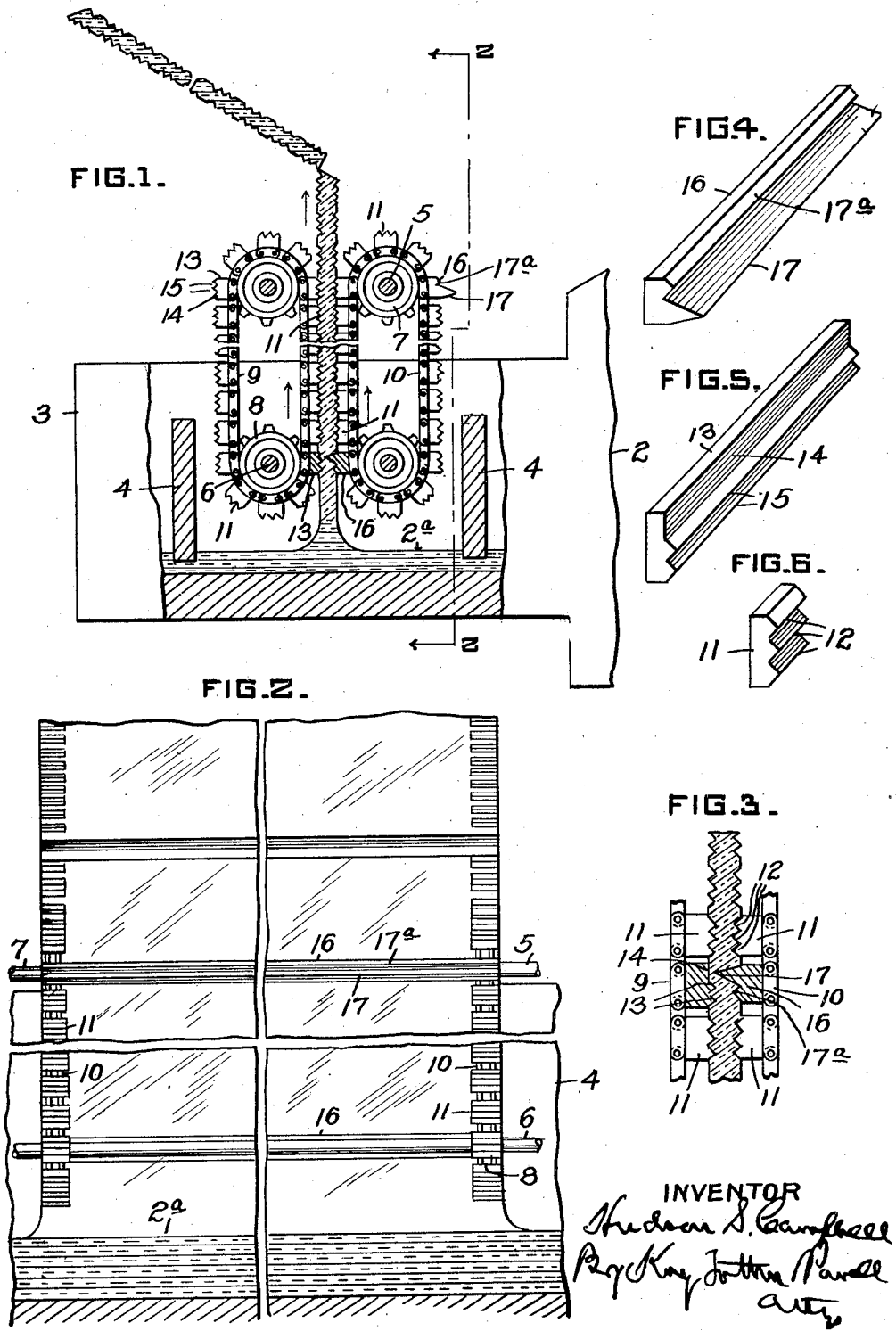

HUDSON S. CAMPBELL, OF CLARKSBURG, WEST VIRGINIA.

CUTTER OR GRIPPER FOR USE IN DRAWING SHEET-GLASS.

1,355,449.  Specification of Letters Patent.  Patented Oct. 12, 1920.

Application filed August 8, 1919. Serial No. 316,109.

*To all whom it may concern:*

Be it known that I, HUDSON S. CAMPBELL, a citizen of the United States, and resident of Clarksburg, in the county of Harrison and State of West Virginia, have invented a new and useful Improvement in Cutters or Grippers for Use in Drawing Sheet-Glass; and I do hereby declare the following to be a full, clear, and exact description thereof.

My invention relates to a cutter and gripper for drawing sheets of glass.

In the application filed by me on the 12th day of February 1919, Serial No. 276,691, I have set forth and claimed a method of drawing glass sheets, and the present invention relates to a cutter and gripper used in connection with said method.

In the drawing of glass sheets from a molten bath of glass it has been found necessary in the methods employed prior to my improved method to chill the edges of the sheet in order to overcome the tendency which all drawn sheet glass has to narrow during the drawing operation. This has been found necessary where a metallic substance such as steel or a refractory substance such as fire-clay blocks are used to grip the glass along the edges, for a metallic or refractory material coming in contact with plastic glass, and at the same degree of temperature as the glass will adhere thereto, so that it is impossible to draw the glass unless some water-cooled means is employed to prevent this adherence of the glass. Furthermore, it is a well established fact that such metallic or refractory materials when water-cooled and reduced to a lower degree of temperature than the glass, will chill the edges and cause them to harden not only at the point of contact, but said chilling or hardening effect will extend into the body of the sheet for several inches, thus causing the sheet in its finished state to be of different degrees or hardness, and the sheet of glass to be properly annealed should enter the annealing leer at a uniform degree of hardness or brittleness throughout its entire area, or it will not anneal uniformly, and hence the finished sheet will not be perfect.

I have discovered that carbon can be brought into contact with a sheet of plastic glass at the same degree of temperature as the sheet without adhering to said sheet, and accordingly my invention consists in forming the cutters and grippers used in connection with the drawing of a sheet of glass, of carbon, so that I am able to draw a sheet of glass of the same or substantially the same uniform degree of temperature throughout its entire area, thus obtaining a perfectly hard or set sheet of glass with a uniform degree of hardness to be introduced to the annealing leer.

I will illustrate my invention in connection with the apparatus employed for carrying out my above referred to method and accordingly Figure 1 is a view of a portion of a suitable furnace with a forehearth extension shown partly broken away, with the drawing apparatus arranged therein; Fig. 2 is a section on the line 2—2 Fig. 1; Fig. 3 is an enlarged view showing the manner in which the sheet is severed; and Figs. 4 and 5 and 6 are perspective views of the cutting and gripping blocks.

In the drawing the numeral 2 designates a suitable furnace with the forehearth 3 into which the glass flows from the furnace 2. In order to cut off to some extent the heat of the furnace from the area from which the glass sheet is drawn, any suitable shielding device 4 may be employed.

The upper and lower shafts 5 and 6 are arranged in pairs parallel to each other in suitable bearings, and mounted on said shaft at each end thereof are the sprocket-wheels 7 and 8, respectively. Chains 9 and 10 are mounted on said sprocket-wheels and power is provided for driving said chains in opposite direction as indicated by arrows, Fig. 1. The links of the chain are provided with gripping-blocks 11 with the serrations or teeth 12 formed therein as shown in Fig. 6. These gripping-blocks are made of carbon. The carbon employed in connection with the making of carbon points for arc-lamps has been found suitable for the purpose, although I did not wish to limit myself to any particular composition or grade of carbon.

At intervals on the chain 9 are the bars 13 which extend from one chain to the other, said bars having the flat faced portions 14 and the serrated portions 15. These bars are likewise made of carbon.

The chains 10 carry the bars 16 which extend from one chain to the other, and said bars are provided with the knife edges 17 and the serrations 17ª. These bars are likewise formed of carbon.

The bars 13 and 16 are so arranged that as the said chains travel said bars will come into register with each other at a point preferably in line with the lower shaft 6, or before said bars leave the peripheries of the lower sprocket-wheel, the knife-like edge 17 coöperating with the flat face 14 of the bar 13 to sever, and the serrations 15 and 17ª coöperating at the same time to grip the glass, all as clearly shown in Fig. 3.

The glass is first lifted from the supply of molten glass in the forehearth by lowering a suitable bait and lifting the glass up between the shafts 5 and 6 to be gripped by the blocks 11 until it is in position for the bars 13 and 16 which by coming in contact with each other sever and grip the succeeding sheet simultaneously at any point desired below the ordinary bait used for starting the draw, and the serrations on the lower part of the bars 13 and 16 which extend clear across the sheet by and into the plastic glass makes the grip for the continuous draw. Furthermore, the blocks 11 on the chains 9 and 10 grip the edges of the sheet and keep the sheet spread taut at all points from the time one set of bars 13 and 16 take hold of the sheet until another set of said bars comes into position to sever and grip the sheet.

As the cutting and gripping bars and blocks are made of carbon, no cooling medium is necessary and said bars and blocks will be brought into contact with the sheet of glass while at the same degree of temperature as the glass, and there will be no adherence or sticking of the glass to the carbon and consequently a sheet of glass is obtained which has hardened and set at a uniform degree of temperature throughout its entire area. As stated above any metallic or refractory substance unless water-cooled will result in the adherence of the glass thereto, and even when water-cooled the chilling effect will penetrate into the sheet of glass beyond the edges and consequently there will not be the hardening or setting of the glass at a uniform degree of temperature throughout its entire area.

Furthermore, the cutter being formed of carbon obviates the adhering of the glass thereto and a clean cut is made while the glass is yet in a plastic condition, so that the cut can be made just above the molten bath of glass, the point of cutting to be determined by the thickness of the sheet of glass which is being drawn, as sheets of glass of different thicknesses will have to be cut at different distances above the bath of glass from which the sheet is being drawn.

What I claim is:—

1. As a new article of manufacture, a cutter and gripper formed of carbon for use in connection with the drawing of sheets of glass.

2. As a new article of manufacture, gripping-blocks formed of carbon having serrations adapted to grip the edges of a sheet of glass in drawing.

3. As a new article of manufacture, a bar formed of carbon having a cutting edge and serrations for the purpose set forth.

In testimony whereof, I, the said HUDSON S. CAMPBELL, have hereunto set my hand.

HUDSON S. CAMPBELL.

Witnesses:
ROBT. D. TOTTEN,
JOHN F. WILL.